United States Patent

[11] 3,586,449

| [72] | Inventor | Heinz Riegler<br>Jena, Germany |
|---|---|---|
| [21] | Appl. No. | 748,898 |
| [22] | Filed | July 17, 1968 |
| [45] | Patented | June 22, 1971 |
| [73] | Assignee | VEB Carl Zeiss<br>Jena, Germany |

[54] VARIABLE SPEED OPTICAL BALANCE IN PHOTOMETRIC MEASURING INSTRUMENTS
3 Claims, 4 Drawing Figs.

| [52] | U.S. Cl. | 356/201, 250/205 |
|---|---|---|
| [51] | Int. Cl. | G01n 21/22 |
| [50] | Field of Search | 356/89, 201, 205; 318/20.250, 20.260; 250/205 |

[56] References Cited
UNITED STATES PATENTS
3,063,043  11/1962  Coates.....................  356/89 W

*Primary Examiner* — Ronald L. Wibert
*Assistant Examiner* — Orville B. Chew, II ABSTRACT: A followup device provides automatic balance in a photometric measuring instrument. The setting time of this device is shortened by moving the optical balancing means at comparatively high velocity and slowing it down only in the immediate neighborhood of the balance. Every change of velocity depends on the value of the output voltage of the measuring instrument and is due to the connection of one of two clutches, each of which engages a corresponding gear system between a servomotor and the balancing means.

INVENTOR

BY Hinz Riegler

ATTORNEY

VARIABLE SPEED OPTICAL BALANCE IN PHOTOMETRIC MEASURING INSTRUMENTS

This invention relates to followup devices for optical measuring instruments with automatic balance.

In optical measuring instruments which operate on a photometric measuring principle and are automatically balanced, a servomotor changes the position of an optical means (diaphragm, slot, analyzer or the like) in such a manner as to restore the state of equilibrium disturbed by the introduction of a specimen. An indicator coupled with the optical balancing means serve as tracking controller, the correction element of which shows integral action. Theoretically, an automatic regulation circuit of this kind will produce no lasting deviation, since a very small change in the measured value of the specimen would make the servomotor shift the optical balancing means and, accordingly, the indicator. In practice, however, the ever present friction will cause a gap in the response, within which the measured value may change without indicator reaction. The responsivity depends on the amplification of the control voltage from the photoelectric receiver, on the servomotor, and on the transmission ratio of servomotor and optical balancing means. The greater the transmission ratio, the more enhanced the responsivity. On the other hand, however, the setting time is rather long and will retard the measurement. This is particularly intolerable if great absolute accuracy within a wide measuring range is desired.

For example, if a polarimeter with automatic balance is required to have a responsivity of 0.005 angular degrees within a measuring range of 100 degrees, the relative responsivity obtainable will be $5 \cdot 10^{15}$. With an asynchronous diphase servomotor of a frequency of 50 cycles, the typical values of a one-second setting of a potentiometric recorder at a relative responsivity of $10^1{}_3$ can be taken into consideration. Accordingly, a responsivity of $5 \cdot 10^{15}$ would correspond to a setting time of 20 seconds. Moreover, if the specimens have high absorption characteristics, the useful signal will be very slight so that, considering the noise, the setting time may still be regarded as too short. An even longer setting time would have to be taken into consideration.

The present invention aims at reducing the setting time in followup devices in optical measuring instruments of the foregoing kind and at obtaining a great time constant in the range of balance by dividing the balancing process into two parts of different setting times.

To this end, the present invention consists in a followup device for optical measuring instruments with automatic balance in which a servomotor causes an optical balancing means effective in the ray path to follow at different velocities depending on the intensities of the control voltages at the servomotor, characterized in that at the moment a preselected voltage is exceeded a means for measuring the control voltage, or voltage proportional thereto, causes a first electrically switchable clutch to engage a first gear system of a transmission ratio $b:1$ ($b>1$) between the servomotor on the one hand and the optical balancing means and the indicator on the other, and that at the moment the control voltage is falling short of said preselected voltage, which takes place near the balance, the control voltage causes a second electrically switchable clutch to engage a second gear system of a transmission ratio $c:1(c\ c>1)$ between the servomotor and the first gear system on the one hand and the optical balancing means and the indicator on the other. A relay tube may be used for comparing the control voltage with a preselectd voltage which is determined by the ignition voltage of the tube. The clutches used are advantageously of the magneto type.

The followup device of the invention operates as follows: The optical means moves at high velocity as long as it is farther than a selected mount away from the balance. In the immediate neighborhood of the balance, however, this velocity is slowed down by the engagement of the second gear system. Accordingly, a short total setting time can be obtained, while the setting period at and close to the balance is comparatively long. The control voltage at the servomotor serves as the criterion for the change of velocity.

In order that the invention may be more clearly understood, reference is made to the accompanying drawings which illustrate diagrammatically and by way of example one embodiment thereof, and wherein.

Figure 1:
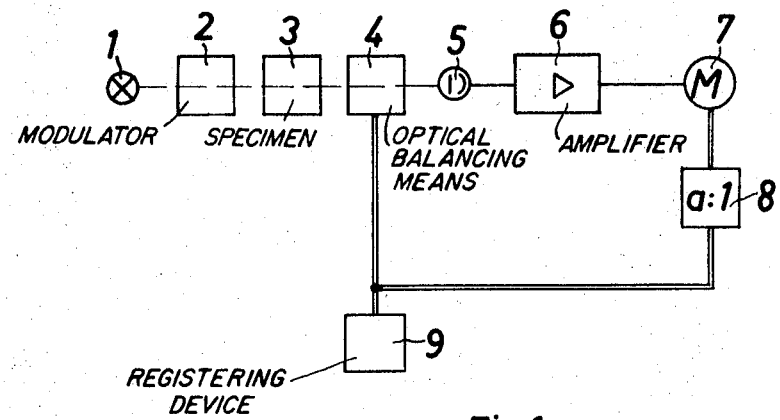
FIG. 1 shows the block diagram of a known optical measuring instrument with automatic balance.

In the known instrument illustrated in FIG. 1 of the drawing, light from a radiation source 1 traverses a modulator 2, a specimen 3 and an optical balancing means 4, and strikes a photoelectric receiver 5. The electric signals emitted by the receiver 5 are directed via an amplifier 6 to a servomotor 7. A gear system 8 transmits the motion of the servomotor 7 to a registering device 9 and the balancing means 4.

Figure 2:
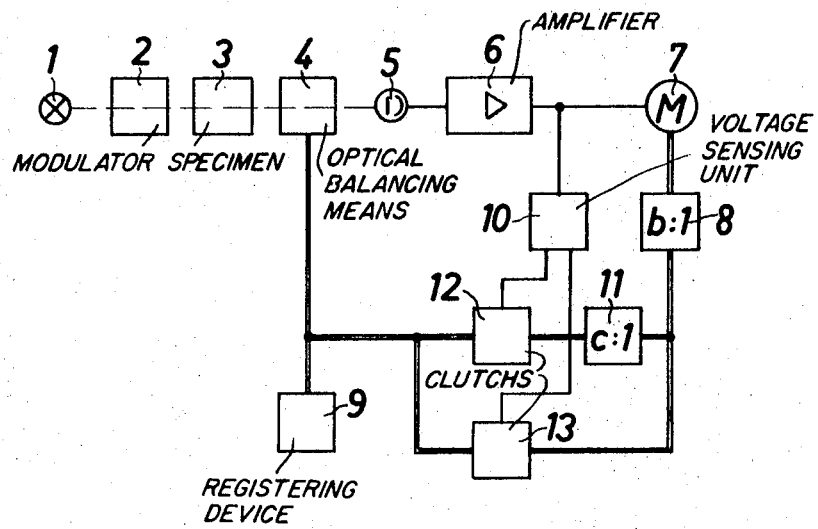
FIG. 2 shows the schematic diagram of a device according to the invention.

The diagram of FIG. 2 corresponds to that shown in FIG. 1, but is amplified according to the invention by a voltage sensing unit 10, a second gear system 11 and two electrically operated clutches (for example magneto clutches) 12 and 13. The ratios of transmission of the gear system 8 and the gear system 11 are $b:1 \cdot c:1 = a1$, the ratio $b:1$ differing from $a:1$ by approximately one order of magnitude ($a, b, c, > 1$).

Figure 3:
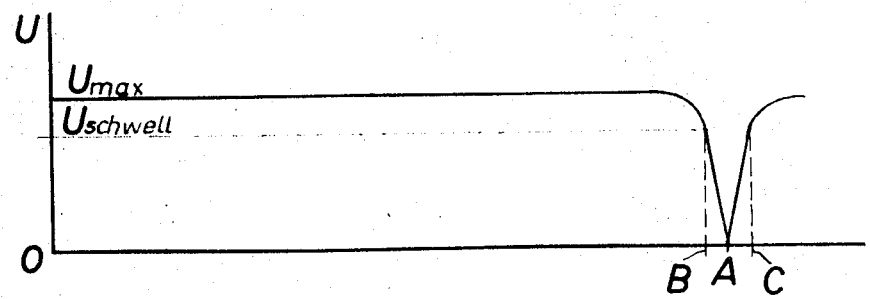
FIG. 3 shows the voltage curve of the servomotor in the balancing process in the device according to the invention.

The curve of the motor voltage U in FIG. 3 reaches its maximum $U_{max}$ already at small variations from the balance point A, which is due to the limiting effect of the amplifier. If the balance point is at zero when no specimen 3 is present, the balance point must be at A when a specimen has been introduced. The motor voltage in the beginning is $U_{max}$, which is greater than the threshold value $U_{thr}$. The voltage sensing unit 10 accordingly engages only the clutch 13. The servomotor 7 adjusts the optical balancing means 4 at the ratio of transmission $b:1$. The path OB is rapidly traversed. The motor voltage U drops at point B to the threshold value $U_{thr}$ of the voltage sensing unit 10, which disengages the clutch 13 and engages the clutch 12. The adjustment of the balancing means 4 becomes slower by the transmission ratio $c:1$ of the gear system 11, and the balancing point A is reach at this lower velocity. As compared with the device shown in FIG. 1, the setting time is 10 to 20 times shorter. Notwithstanding this advantage, the technical setup of the device according to the invention is rather simple.

Figure 4:
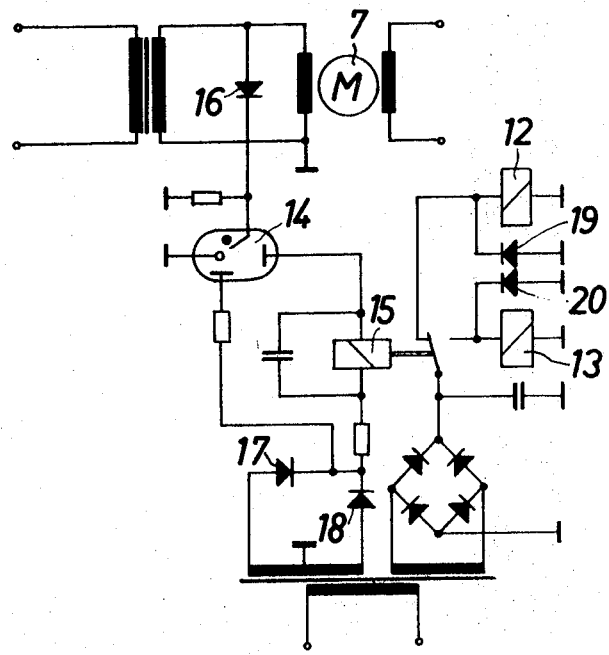
FIG. 4 shows the block diagram of the voltage measurement.

The voltage sensing unit 10 shown in FIG. 4 comprises substantially a relay tube 14, which ignites at the moment the ignition voltage is exceeded, and via a relay 15 engages the clutch 13 instead of the clutch 12. Rectifiers 16, 17, 18 provide that the relay tube 14 can be ignited in the first quadrant only. Rectifiers 19 and 20 suppress the spark when the respective contacts are opened.

I claim:

1. A followup device for optical measuring instruments with automatic balance comprising:
   a servomotor,
   an optical balancing means,
   a photoelectric receiver and an amplifier,
   means for comparing the control voltage supplied from the output of said amplifier to said servomotor with a preselected voltage,
   a first gear system of a transmission ratio $b:1(b>1)$,
   a second gear system of a transmission ratio $c:1(c>1)$,
   a first electrically switchable clutch,
   a second electrically switchable clutch,
   and means for switching on said first clutch by a control voltage exceeding said preselected voltage so as to engage said first gear system between said servomotor and said optical balancing means and for switching on the said second clutch by a control voltage falling short of said preselected voltage so as to engage said first and said second gear system between said servomotor and said optical balancing means.

2. A followup device as claimed in claim 1, wherein said means for comparing the control voltage with a preselected voltage is a relay tube, the preselected voltage being determined by the ignition voltage of said tube.

3. A followup device as claimed in claim 1, wherein said electrically switchable clutches are of the magneto type.